United States Patent [19]
Groves et al.

[11] 3,917,451
[45] Nov. 4, 1975

[54] ELECTROKINETIC STREAMING CURRENT DETECTION

[75] Inventors: James N. Groves; Joel H. Kaplan, both of Schenectady, N.Y.

[73] Assignee: General Electric Company, Schenectady, N.Y.

[22] Filed: July 2, 1973

[21] Appl. No.: 375,714

[52] U.S. Cl. ............. 23/230 B; 23/253 R; 204/1 T; 204/195 B; 324/71 R; 73/53
[51] Int. Cl.² .................. G01N 33/16; G01N 27/00
[58] Field of Search .......... 23/230 B, 230 R, 253 R; 204/1 T, 195 R, 195 B; 324/30 R, 32, 71 R; 73/53; 195/103.5 R

[56] References Cited
UNITED STATES PATENTS

| | | | |
|---|---|---|---|
| 3,368,144 | 2/1968 | Gerdes........................ | 324/71 R X |
| 3,369,984 | 2/1968 | Gerdes et al.................. | 324/71 R X |
| 3,399,133 | 8/1968 | Gerdes et al.................. | 210/42 |
| 3,526,827 | 9/1970 | Cardwell...................... | 324/32 |
| 3,612,998 | 10/1971 | Turner et al.................. | 324/71 R |
| 3,799,743 | 3/1974 | Alexander et al............. | 23/253 R |

*Primary Examiner*—Morris O. Wolk
*Assistant Examiner*—Timothy W. Hagan
*Attorney, Agent, or Firm*—Jane M. Binkowski; Joseph T. Cohen; Jerome C. Squillaro

[57] ABSTRACT

An electrokinetic streaming system with an oscillating drive is employed for the rapid, accurate reproducible detection of the fixed charge density of a coating on the inner surface of a flow restriction disposed in the path of oscillating plug-like liquid flow. As an application of this invention, identification of biological materials can be made and reactions can be detected between a reference coating of biological material and a coating of a second biological material, for example, an antigen-antibody (or antibody-antigen) reaction.

18 Claims, 9 Drawing Figures

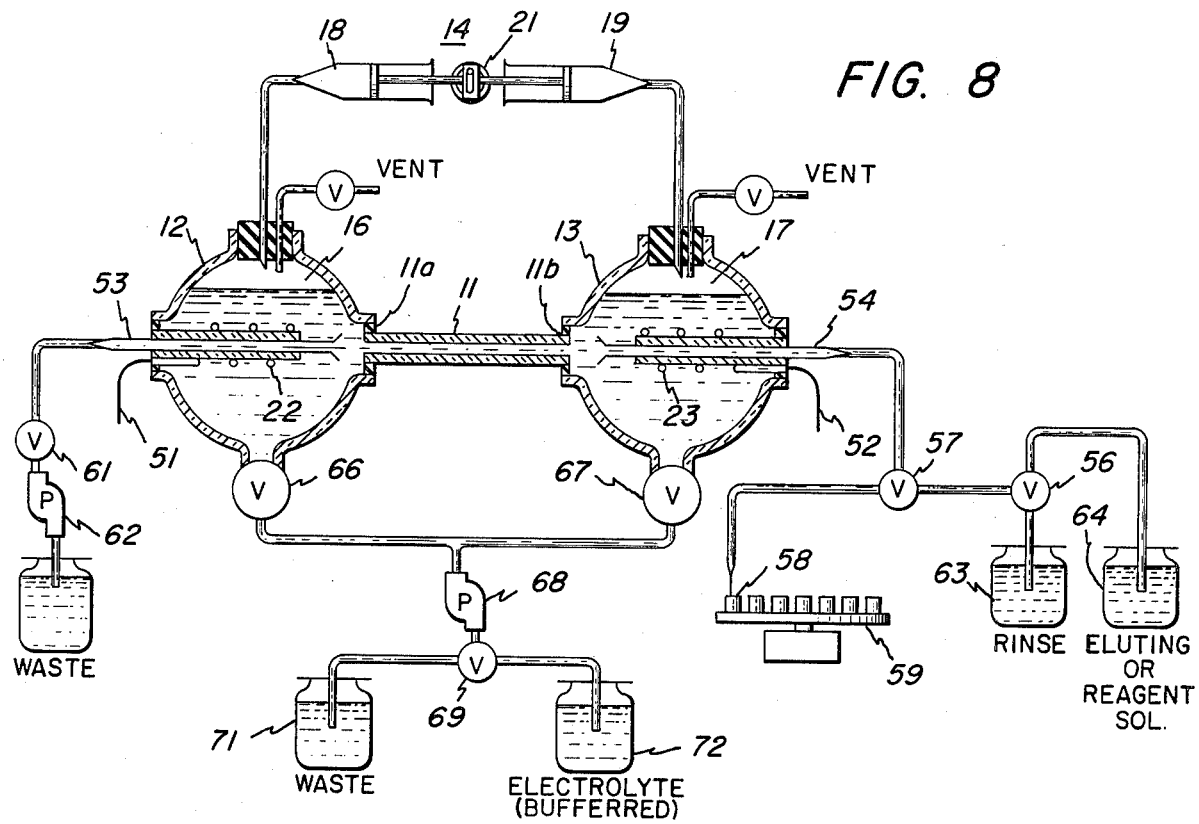

3,917,451

ELECTROKINETIC STREAMING CURRENT DETECTION

BACKGROUND OF THE INVENTION

Alternating streaming current detectors have been employed for the measurement of flocculant effects on suspended particulates in fluids (e.g. U.S. Pat. No. 3,399,133 - Gerdes et al. and U.S. Pat. No. 3,526,827- Cardwell.

In the Gerdes et al patent an aqueous liquid containing charged particles is forced in one direction past a first electrode, through a capillary and past a second electrode for discharge from the system.

The Cardwell patent employs a vertically extending dead-ended bore in combination with a piston moving in a reciprocating fashion in the bore. One electrode is located at the bottom of the bore and another electrode at the top. The sample liquid is pulsed up and down between these electrodes by the movement of the piston in the bore and an alternating current pulse is generated.

Neither of these patents, however, teaches the use of alternating streaming current for identifying biological materials or for detecting physical and chemical interaction between biological materials at the interface between layers of such materials. To date, techniques developed for surface interface measurements have included reflection infrared absorption, surface energy measurement, isotope tagging and ellipsometry. Improved apparatus for making surface interface measurements as well as for detecting the adsorption phenomenon and changes therein would be of considerable value to the art.

SUMMARY OF THE INVENTION

A streaming current detector has been provided with oscillating drive means by which a volume rate of flow of liquid varying as a function of time is made to oscillate through a flow restriction (e.g. a capillary bore). In addition, means are provided by which the flow restriction may be isolated and, as well, flow communication can be established with the flow restriction for selectively circulating a fluid to the interior thereof. The flow restriction may, if preferred be made removable.

This modified apparatus enables rapid and accurate identification of coatings of different biological materials selectively applied to the inner surface of the flow restriction (preferably a capillary) and, as well, enables the detection of reactions between a reference coating of biological material on the inner surface of the flow restriction and a coating of a different biological material applied thereover. An example of the latter would be an antigen-antibody (or antibody-antigen) reaction.

BRIEF DESCRIPTION OF THE DRAWING

This invention will be better understood from the following description and drawing in which:

FIG. 8 is a schematic representation of the oscillating electrokinetic streaming current system of this invention provided with the preferred capillary bore isolation means and means for introducing a serum sample, testing and then preparing for a new sample and FIG. 9 is an autotitration system applied to the streaming current system of this invention for varying the pH of the electrolyte.

DESCRIPTION OF THE PREFERRED EMBODIMENT

Figure 1:
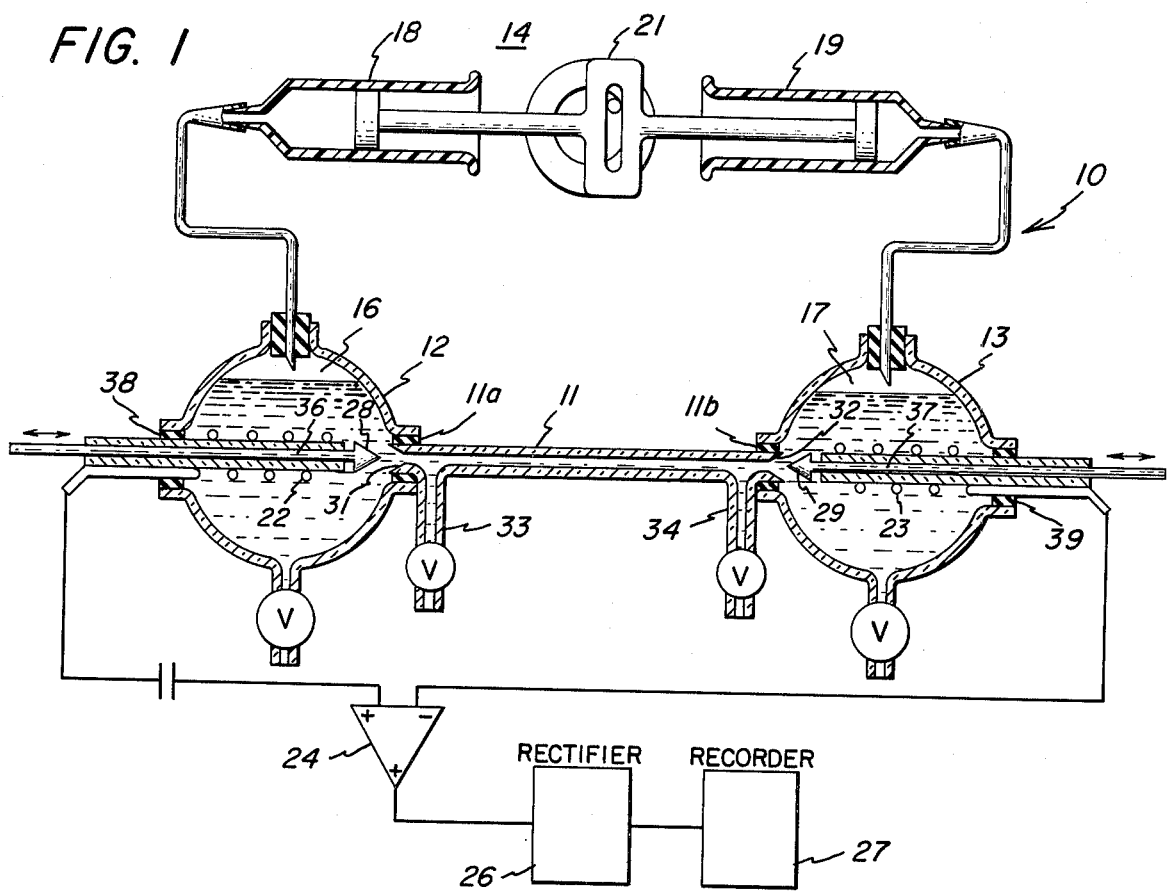
FIG. 1 is a schematic representation of an oscillating flow streaming current detector of this invention.

FIG. 1 schematically illustrates the system of this invention, which comprises an analytical tool for detecting reactions between biological materials (e.g. antigen-antibody reactions), for measuring biological material compatibility with non-biological material, for identifying biological materials and for detecting hormones, enzymes, metabolites, etc. by the immune assay procedure. By this latter procedure, the item of interest, e.g. growth hormone, is isolated; an antibody therefor is developed and a layer of this antibody is applied to the inside surface of the capillary of the detection system described herein. Serum sample is introduced and, if a reaction occurs, the item of interest is present in the serum.

In oscillating flow streaming current detector 10 capillary 11 is shown interconnecting a pair of electrolyte reservoir chambers 12, 13. Capillary 11 could be replaced by a diaphragm with one or more holes therethrough. By proper design of seals 11a, 11b and the seats therefor, capillary 11 can be made removable. The bore through capillary 11 may have a diameter in the range of from 0.5–5 mm with the preferred size being in the range of 1–2 mm. Preferably, capillary 11 is a tube of glass, metal or plastic material that will provide optimum adhesion for the layer of material to be applied thereto.

Chambers 12, 13 are filled about three quarters full of an electrolyte such as a buffered solution of composition, ionic strength and pH compatible with the biological material(s) being utilized. A suitable electrolyte for tests described herein is 0.01 M $PO_4$, pH 7.2. The oscillating drive means shown herein (mechanical drive with pneumatic coupling) is preferred, but other drive/-coupling arrangements may be used.

Oscillating electrolyte flow through capillary 11 is established and maintained by positive displacement pump 14 driving the gas (usually air) volumes 16 and 17 above the electrolyte volumes. As pump 14 applies pressure to volume 16 a vacuum of equal magnitude is exerted on volume 17 and vice versa. In place of this reciprocal pneumatic coupling to the electrolyte volumes, a reciprocal mechanical coupling driving a diaphragm disposed in each electrolyte chamber could be employed.

Pump 14 comprises two piston/cylinder combinations 18, 19 operated in push-pull movement by a motor (not shown) driven Scotch yoke 21. Syringes (10 ml) are adequate for the piston/cylinder combinations. The frequency of the push-pull movement (resulting in what may be considered a liquid piston oscillating in the bore of capillary 11) may vary from about 0.3 to 2 Hz with the preferred frequency being 1 Hz. Using 10 ml syringes the peak volume displacement rate is about 10 $cm^3$/sec and this displacement volume rate varies sinusoidally with time due to the characteristics of the drive mechanism.

The electrolyte flow through capillary 11 causes a charge imbalance between chambers 12 and 13, the magnitude of the charge imbalance being directly proportional to the fixed charge density on the capillary inner surface as is well-known in electrokinetic theory. One or the other of large area reversible (non-polarizing) electrodes 22, 23 collects the excess charge injected into one chamber and returns it to the other (charge-depleted) chamber through low input impedance (about 400 ohms or less) current-measuring amplifier 24.

Both platinum and silver-silver chloride electrodes have been found satisfactory and yield about equal performance. Other electrode materials such as gold, silver, etc. can be employed as described in Gerdes et al. patent (incorporated by reference).

The measurement of streaming current (as contrasted to measuring streaming potential) largely obviates the electrolyte conductivity effect in the system permitting a much larger range of useable salt concentrations. This streaming current system in combination with the low input impedance amplifier 24 permits measurement at human physiological saline conditions, if desired.

A sinusoidal alternating current of the order of $10^{-8}$ amps is generated in the system described, this current is amplified by the current-to-voltage amplifier 24, rectified by a polarity sensitive synchronous rectifier 26 and recorded as a D.C. value on potentiometer-type strip chart recorder 27.

In addition to providing oscillating drive means, streaming current detector 10 has been constructed according to this invention to permit the isolation of the bore of capillary 11 from the rest of the system and, as well, the selective introduction into the bore of fluids (e.g. blood samples) for various purposes. A preferred capillary isolation and sample introduction arrangement is shown in FIG. 8.

The isolating mechanism shown in FIG. 1 consists of push valves 28, 29 adapted to be moved into or out of sealing relationship with recessed portions 31, 32, respectively, of capillary 11. The selective introduction and removal of fluids to and from the bore of capillary 11 is accomplished by means of valved conduits 33 and 34. Valve rods 36, 37 for valves 28 and 29, respectively, extend through the electrode structures, which in turn are mounted in the electrolyte chambers by means of seals 38, 39.

The system is stable and reproducible and readily serves for generating comparative information of the type displayed in FIGS. 3–7.

Figure 2:
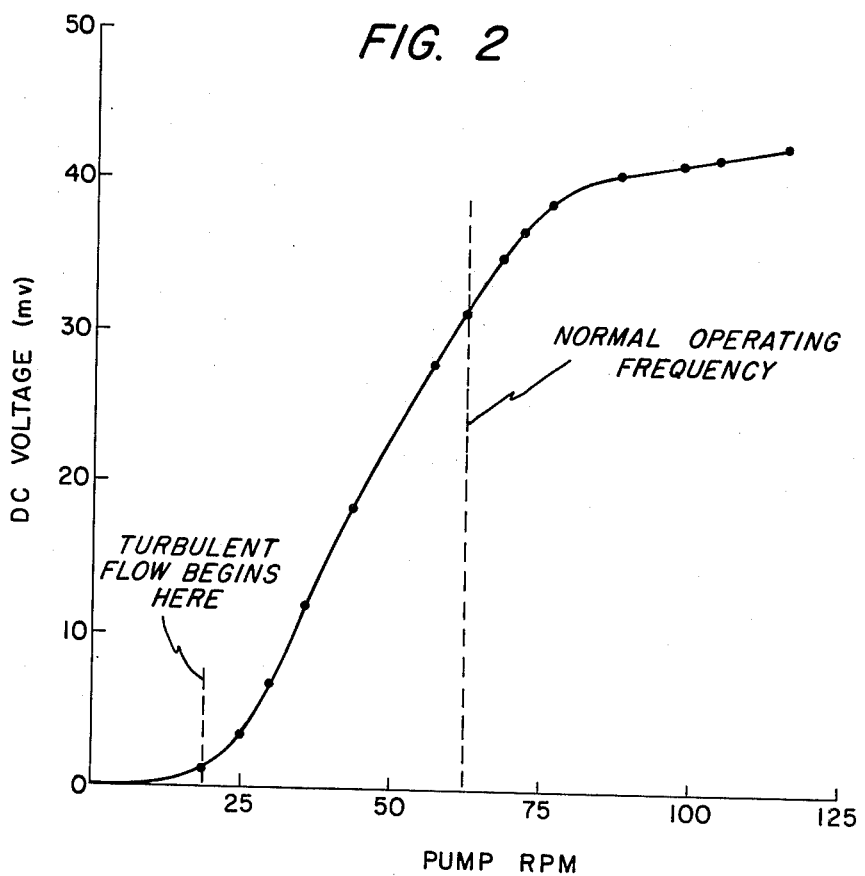
FIG. 2 is a graph showing that the oscillating flow system is operated with turbulent flow in the capillary.

As may be seen in FIG. 2, liquid flow through the bore of capillary 11 is turbulent. Although the abscissa of the graph in FIG. 2 is indicated in pump RPM, this parameter is directly convertible to capillary bore flow velocity in the positive displacement system of FIG. 1.

The calculated onset of turbulence is at 19 RPM, falling just at the beginning of the steep increase in output. The velocity of liquid near the wall of the capillary bore is much greater in turbulent flow, greatly increasing the sensitivity of this device over the sensitivity thereof, if the flow were laminar. This turbulence is achieved because of the extent of stroke volume made possible in pump 14.

A number of different materials have been applied directly to the inner surface of the bore of capillary 11 to serve as substrates for the adsorption thereon of proteins.

TABLE I

Figure 3:
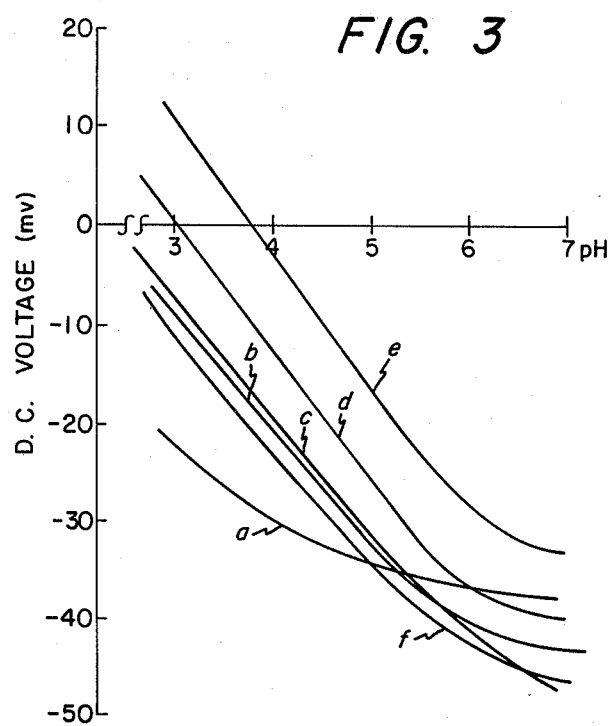
FIG. 3 is a graphic representation of surface charge versus pH of uncontaminated exposed surfaces of various materials.
Figure 4:
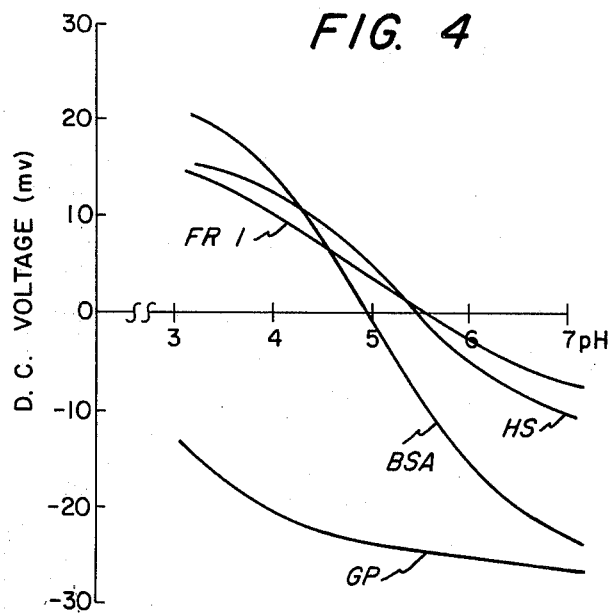
FIG. 4 graphically displays the characteristic pH-voltage signatures of several negatively charged blood proteins, each separately adsorbed as an individual layer on a substrate.

| Type of Bore Surface | Method of Producing Surface | Designation in FIG. 3 |
|---|---|---|
| Clean Glass | Chemical cleaning and baking | a |
| Methylated Glass | Use of trimethylchlorosilane | b |
| Aminated Glass | Use of aminopropyltriethoxysilane | (not shown) |
| Octadecylated Glass | Use of octadecyltrichlorosilane (ODTCS) | c |
| Polyethylene | Commercial tubing | d |
| Silicone-Polycarbonate Copolymer | Cast over bore of glass capillary | e |
| RTV-Silicone | Cast around removable core | f |

As shown in Table I, the selection of coating materials has extended from hydrophobic (low energy) surfaces to wettable (high energy) surfaces. The use of octadecylated glass is representative of chemical modifications that can be made of a glass capillary bore surface. The surface so produced with ODTCS is hydrophobic (contact angle of 110°) and provides strong multiple contact bonding to hydrophobic regions in adsorbing proteins and macromolecules.

By way of example, the octadecylated glass capillaries were prepared as follows: stock Pyrex glass tubing was cut to length (about 6 cm) and degreased (about 2 hours) in chloroform; the capillaries were etched in 75% $HNO_3$ for 4 hours, rinsed in distilled water, exposed to 50% NaOH to generate OH sites on the glass surface; after rinsing, the capillaries were baked (500°C) for 6 hours and exposed to 10% volume/volume of ODTCS in toluene with 0.5% vol/vol of triethylamine for 12 hours at about 22°C. The capillaries so prepared were then ready for the adsorption on the surfaces of the bores thereof of coatings of various biological materials such as proteins, blood fractions, hormones etc.

Figure 6:
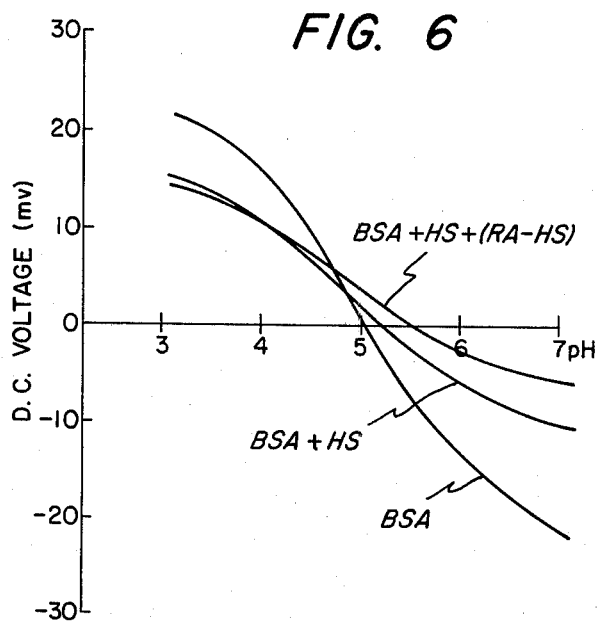
FIG. 6 graphically displays a similar effect utilizing a different substrate and, in addition, the effect on the albumin/human serum system of the application thereto of rabbit anti-sera.
Figure 7:
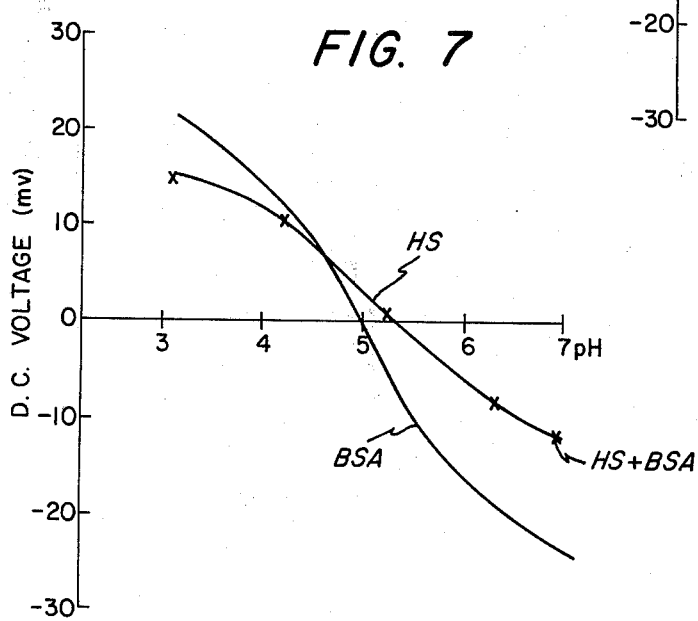
FIG. 7 graphically displays the inverse of FIG. 5; namely, the effect of a coating of albumin applied over a coating of human serum.

Thus, in determining the presence of antibodies in serum, the antigen is first attached to the inner surface of a capillary bore and a signal proportional to the characteristic surface charge at the coating/capillary surface interface is measured. The antigen coated surface is then exposed to blood serum or a dilution thereof. If this serum contains specific antibody protein (along with the other non-reacting serum proteins that are normally present) the antibody will react with the original antigen coating forming a new firmly attached coating having a different characteristic charge indicating that an antigen-antibody reaction has occurred. This reaction will have resulted in a bond retaining the antibody protein and its charge. The bond is tight enough that the antibody protein is not removed by washing as is the case with other proteins present in the serum. The difference in electrical signal developed between the original antigen coating and the subsequent antibody coating provides a measure of the reaction that has occurred as is shown in FIG. 6.

As is strikingly evident in FIG. 3, all of the surfaces tested (except the aminated glass, not shown, which appeared positive) became highly negative even utilizing a distilled water electrolyte at pH values above about 5. The designations for the curves in FIG. 3 correlate with the letters shown in the last column of Table I. The voltage indicated as the ordinate of the graph of FIG. 3 is a D.C. voltage having a sign correlated with the sign of the charge on the capillary surface. Thus, negative values of voltage on the graph represent negative fixed charge on the surface of the capillary bore. All of these negatively charged surfaces adsorb negatively charged proteins rapidly and quite strongly at pH 7 as may be seen in FIG. 4. In the data displayed in FIG. 4, the surface of the bore of the capillary presented an octadecylated surface found to readily adsorb various negatively charged blood proteins at pH 7. Correlation of the abbreviations designating curves in FIG. 4 (as well as in FIGS. 5–7) is given in Table II.

TABLE II

| Abbreviation | Material |
| --- | --- |
| BSA | bovine serum albumin |
| FR1 | fibrinogen |
| GP | glycoprotein |
| HS | human serum |
| RA-HS | rabbit anti-sera |

Each of the layered systems produced by adsorption of the various blood proteins over the octadecylated substrate yield their own characteristic pH-voltage signatures. All are quite stable and repeatable on this same substrate. There is a definite repeatable pH-voltage signature for each protein coating.

A determination was made of the sensitivity of this system to protein adsorption on a given substrate. This determination was made using bovine serum albumin (BSA) in a buffer (0.01 M potassium phosphate buffer, pH 7.4) and borosilicate glass as the substrate. It was found that below about $2 \times 10^{-5}$ gm/ml there is insufficient total protein present in the bore of capillary 11 to give a full-packed monolayer over the surface thereof, but the actual effect with this very small amount of surface coverage is extremely large. Assuming that $2 \times 10^{-5}$ gm/ml provides a full monolayer (spread over the surface of the bore of the capillary), then 1% coverage of the surface is sufficient to produce 50% of the total change in charge density observed. The small amount of BSA protein thus detected is indicative of the capability of the system to detect very low concentrations of protein adsorption on the surface of the capillary bore. In further work with BSA, it was found that although BSA could be adsorbed on the surface of the bore of a glass capillary and anti-BSA could be detected by being brought into contact with the BSA, it was found that BSA desorbed from glass very rapidly. However, when the highly hydrophobic octadecylated surface is used for the surface of the capillary bore, BSA has remained stable over a period of 900 hours of storage in protein-free buffer at 40°C.

Figure 5:
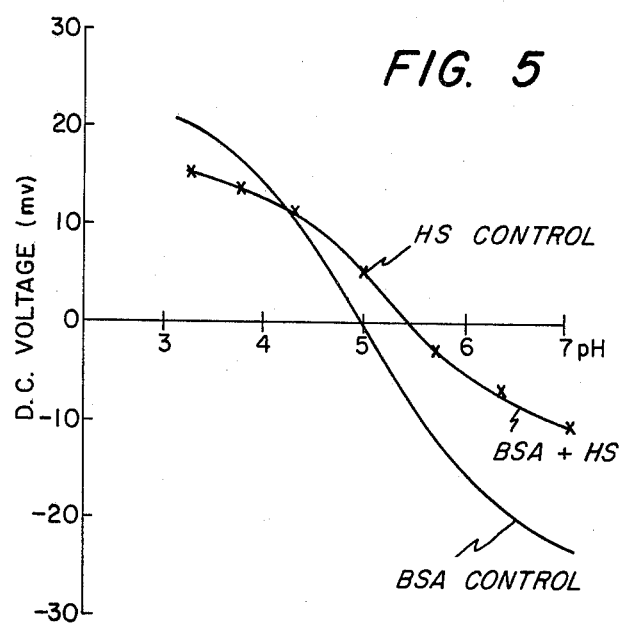
FIG. 5 graphically indicates the effect on a layer of adsorbed albumin by a later-applied coating of human serum.

As is shown in FIG. 5, a coating of BSA in a buffer applied over an octadecylated surface was completely displaced (or covered up) by a coating of human serum (HS) when the BSA coated surface is exposed to the HS. Octadecylated glass was exposed to albumin (1% wt/vol BSA in 0.02 M Tris-HCl, pH 7.15 for 21 hours to insure a full coating) and this albumin coated surface was exposed to HS (0.7% wt/vol HS in 0.02 M Tris-HCl, pH 7.15 for 24 hours). The Tris-HCl was prepared by adding HCl to tris(hydroxy-methyl) aminomethane [Trizma Base Reagent Grade] to adjust the pH to 7.15. The resultant coating is identical to a control (indicated by points labeled X) in which HS alone was adsorbed on an octadecylated surface and tested. The lower curve is a control curve insuring that the expected BSA coating was actually obtained prior to exposure of the BSA-coated bore to the HS.

Displacement of a BSA coating from a layer of silicone-polycarbonate copolymer cast on the bore surface of a glass capillary by later contact with HS is shown in FIG. 6. The result of this test verified the findings in FIG. 5 for a different substrate; namely, that some protein present in HS is more adherent than albumin.

Further verification of this conclusion was made by determining whether BSA would displace or cover up a previously deposited HS layer. An octadecylated surface was exposed to HS ($7 \times 10^{-3}$ gm/ml in 0.02 M Tris-HCl, pH 7.15) for 24 hours and was then exposed to BSA (0.5% wt/vol in 0.02 M Tris-HCl, pH 7.15) for 22 hours under essentially the same conditions as in connection with the data for FIG. 5. As may be seen by comparison of FIG. 7 with FIG. 5, the resulting surface remained identical to HS in its characteristics. Any displacement or coverage of the HS would have shifted the curve back toward the BSA characteristic curve. Thus, it could be concluded that the globulin-like coating produced by HS is more adherent than albumin coating on the same surface and the albumin does not adhere to the HS coating. On the other hand, it was found in another test that when a glycoprotein coating was exposed to albumin it showed an unmistakeable shift toward the albumin characteristic, possibly due to the intercalation of the BSA into the glycoprotein (GP) layer.

Experiments conducted with the apparatus of this invention have also been used to establish the rapidity with which surfaces are coated with protein when the surfaces are contacted with blood. Within 10 seconds of exposure of a hydrophobic octadecylated surface to fibrinogen, a coating was obtained that was essentially identical to a coating obtained from much longer incubation times. Thus, an essentially complete layer was obtained within 10 seconds.

The preferred capillary isolation means together with means for injecting a sample (e.g. serum) into the capillary, testing the sample/coating reaction and then preparing for the injection of a new sample is schematically set forth in FIG. 8. Elements 11 through 23 remain the same as the comparable structure in FIG. 1. Amplifier 24, rectifier 26 and recorder 27 are not shown, however, leads 51, 52 are shown, which would connect to amplifier 24 in order to connect electrodes 22, 23 electrically thereto.

Hollow stemmed sliding valves 53, 54, when moved with the flanged flexible tips thereof into sealing contact with the ends of capillary 11, serve in combination not only to isolate the bore of capillary 11, but also serve as means for introducing material into (and removing material from) the capillary bore.

It is well known that certain antigen-antibody reaction complexes can be dissociated without destruction of reactivity by exposure of the complexes to low pH and/or high salt concentration. Thus, by irreversibly attaching either an antigen or an antibody coating to the capillary bore surface, such a coating can be reused, permitting the conduct of repeated tests in which blood samples are sequentially introduced into contact with the coating in order to detect complementary antibody or antigen materials present in the samples.

Given a specific antigen or antibody coating attached to the wall of bore 11, it is merely necessary to slide the valves 53, 54 into contact with the ends of capillary 11 and (for the initial sample) thereafter to:

a. turn valve 56 to a no-flow position,
b. position valve 57 to place serum sample 58 from sample-holding turntable 59 into flow communication with the interior of slide valve 54,
c. position valve 61 to permit flow therethrough,
d. turn on pump 62 to empty the contents of hollow slide valve 53, the bore of capillary 11 and slide valve 54 and then fill these volumes with a portion of serum sample 58,
e. turn off pump 62 and maintain the sample material in contact with the bore coating for the period of time required for conduct of the reaction, if any,
f. position valves 56 and 57 to place rinse container 63 into flow communication with the bore of capillary 11 (note valve 61 is still in open position) whereupon by turning on pump 62, the bore of capillary 11 is washed clean of non-reacting serum components.

Then, by withdrawing valves 53, 54, the bore of capillary 11 is placed in flow communication with electrode chambers 12, 13. The action of pump 14 is then initiated. After measuring for the occurrence of a reaction, the reactive antibody (or antigen) may be eluted from the system by placing eluting solution 64 in flow communication with the bore of capillary 11 and flowing this low pH, high salt content fluid through the capillary to regenerate the bore coating for the next test. Thereafter, the process would be repeated with another sample from turntable 59.

Also, with the arrangement shown the electrolyte can be simultaneously removed from chambers 12, 13 via valves 66, 67, pump 68, valve 69 and waste container 71. Similarly, chambers 12, 13, can be simultaneously replenished with clean electrolyte from container 72 through the same series of valves and pump.

Improved sensitivity and stability can be obtained by chemically bonding the protein or other biological material to the surface, as for example, by the use of coupling agents, such as are described in U.S. Pat. No. 3,519,539 — Messing et al., incorporated by reference. Similar approaches for the attachment of biological materials (e.g. any protein material having reactive primary amine groups) to a glass surface are described in P. J. Robinson et al., "Porous glass as a Solid Support for Immobilization or Affinity Column Chromatography of Enzymes", Biochim, Biophys. Acta 242 (1971) 659 –661 and H. H. Weetall, "Storage Stability of Water-insoluble Enzymes Covalently Coupled to Organic and Inorganic Carriers", Biochimica, Biophysica Acta 212 (1970) 1 –7. The first step of both procedures involves attachment of 3-aminopropyltriethoxysilane (APTES) to the glass leaving a terminal amine group. In the Robinson et al., procedure the acid chloride of p-nitrobenzoyl chloride is then reacted with the terminal amine. The arylnitro group is reduced and diazotized to an aryldiazonium salt. The aryldiazonium salt is then coupled to the free amine sites of the final protein coating thus producing covalent coupling all the way back to the glass. The second, simpler, procedure utilizes glutaric dialdehyde to provide a coupling bridge between the amine on the APTES and protein amine. These bonds are less permanent in an aqueous environment than the azo coupling, but are an improvement over physical adsorption.

The above procedures (Robinson et al., and Weetall are incorporated by reference) represent only two of many, which might be used to bond proteins and other biological materials to the surface of an electrokinetic streaming system flow path. The substrate material can also vary (polymers, ceramics, metals, gels), glass being but one example. Thus, the substrate material can be selected and altered to best suit coupling and performance requirements.

The autotitration system schematically set forth in FIG. 9 is used to controllably vary the pH of the electrolyte in chambers 12, 13 of detector 10 to generate the data for characteristic curves, such as are shown in FIGS. 3–7.

In order to conduct a pH titration sweep to acquire such data, valves 81 and 82 are positioned to place chambers 12 and 13 into flow communication with waste vessel 83. A vacuum is drawn in vessel 83 and the electrolyte is withdrawn from vessels 12, 13 simultaneously.

Tritration vessel 84 will have been previously been filled with clean buffered electrolyte from supply vessel 86 by applying air pressure therein and properly positioning valve 87. Vessel 84 is large enough to accommodate a volume of electrolyte equal to the volumes of electrolyte required in both vessels 12 and 13. While in vessel 84, the pH of the electrolyte will have been adjusted. Thus, by applying air pressure to the interior of vessel 84 via valve 88, clean pH-adjusted electrolyte is transferred simultaneously to vessels 12 and 13 (valves 87, 81 and 82 being properly positioned).

During the pH adjustment operation, radiometer 89 [pH Meter 26 as manufactured by the Radiometer Corporation, Copenhagen] is set for the desired pH value, electric pump 91 automatically turns on and pumps the requisite amount of acid from container 92 into the electrolyte contained in vessel 84. The contents of vessel 84 is rendered homogeneous by the action of stirrer 93, while the changing pH thereof is sensed by pH sensor 94. As the pH approaches the value of pH set on radiometer 89, pump 91 slows down and when the desired pH is reached the pump stops.

When the transfer of the pH-adjusted electrolyte to vessels 12, 13 has been completed, valves 81, 82 are closed and the procedure described hereinabove is conducted by which the D.C. voltage (streaming current) of the coating of the capillary bore is determined at the new pH value.

After the full sweep of readings at a series of pH values has been taken, the electrolyte discarded and replaced with buffered electrolyte (pH 7.0), the D.C. current voltage is redetermined for the same coating for comparison with the original reading at pH 7.0. Some proteins applied as coatings on bore surfaces made of certain materials show very little change from the original reading after the reinsertion of the buffer, while others show considerable change. When the change is significant, titration is repeated. Albumin on ODTCS repeats quite well and GP on ODTCS repeats remarkably well. In those instances in which a different curve results on repeated titration, two (or more) curves will be available for identification of the biological material.

The method of this invention is basically employed for the characterizing of a biological material (e.g. identification thereof, adsorption thereof on a substrate, interaction thereof with a substrate, etc.). The term "reaction" as employed herein includes both physical and chemical interactions.

What we claim as new and desire to secure by Letters Patent of the United States is:

1. Apparatus for use in electrokinetic streaming current detection comprising in combination:
   a. a pair of electrolyte chambers having electricaly non-conducting wall structure,
   b. means interconnecting said pair of chambers for providing flow communication therebetween through a flow restriction,
   c. a first reversible electrode projecting into the first of said chambers and being adapted to be electrically connected externally of said first chamber,
   d. second reversible electrode means projecting into the second of said chambers and being adapted to be electrically connected externally of said second chamber and
   e. means in flow communication with said first and second chambers for simultaneously applying pressure in said first chamber and suction in said second chamber and then reversing and simultaneously applying pressure in said second chamber and suction in said first chamber, the reversal of the pressure/suction action being accomplished according to a fixed frequency whereby when said chambers are partially filled with electrolyte, oscillating flow of electrolyte through the flow restriction is established and maintained, said electrodes being connected to an amplifier the output of which is connected to a rectifier/recorder combination.

2. The apparatus of claim 1 wherein the flow restriction is in the form of a capillary tube.

3. The apparatus of claim 2 wherein means are provided for selectively isolating the bore of the capillary tube from flow communication with the open volume of the chambers.

4. The apparatus of claim 1 wherein the means for simultaneously reversibly applying pressure and suction to the chambers comprises a mechanical drive with pneumatic coupling to said chambers.

5. The apparatus of claim 4 in which the mechanical drive is a pair of piston/cylinder combinations and drive means for the pistons such that the displacement volume rate of each piston varies sinusoidally with time.

6. The apparatus of claim 1 wherein the inner surface of the flow restriction is coated with biological material.

7. The apparatus of claim 1 wherein the flow restriction is removable.

8. The apparatus of claim 7 wherein the removable restriction is a capillary tube.

9. The method of characterizing a biological material comprising the steps of:
   a. depositing at least one layer of biological material on the inner surface of a flow restriction,
   b. passing an oscillating flow of liquid electrolyte through said flow restriction in contact with said layer by which the volume rate of flow varies as a function of time, said electrolyte being of a preselected value of pH and remaining electrically coupled with a pair of electrodes, one of said electrodes being disposed on either side of said flow restriction,
   c. amplifying the alternating current generated by the oscillating flow of electrolyte,
   d. rectifying the alternating current and
   e. recording the value of the resulting direct current.

10. The method of claim 9 in which the electrolyte is automatically titrated to the desired pH value.

11. The method of claim 9 in which two layers of different biological materials are deposited.

12. The method of claim 11 wherein the second layer of biological material is applied by isolating a volume including the flow restriction bore and then admitting the second biological material to said bore.

13. The method of claim 11 in which the two layers present antigen-antibody interaction.

14. The method of claim 11 wherein the oscillating flow is turbulent.

15. The method claim 9 wherein the rate of oscillation is in the range of from 0.3 to 2 Hz.

16. The method of claim 9 wherein the volume rate of flow varies sinusoidally with time.

17. The method of claim 9 wherein the step of depositing the at least one layer of biological material is accomplished by chemical bonding.

18. The method of claim 9 in which the sequence of steps is repeated at a series of values of pH for the electrolyte.

* * * * *